United States Patent [19]

Jensen et al.

[11] Patent Number: 5,716,186
[45] Date of Patent: Feb. 10, 1998

[54] GONDOLA MOVER AND MOVING METHOD

[76] Inventors: Steven D. Jensen, 1226 Idaho Ct.; Donald E. Barber, 920 Idaho, both of Ames, Iowa 50014

[21] Appl. No.: 562,127
[22] Filed: Nov. 22, 1995
[51] Int. Cl.$^6$ ................................................ B60P 1/02
[52] U.S. Cl. .................. 414/458; 187/244; 254/2 R; 280/43.17
[58] Field of Search .................. 414/458, 471, 414/490, 495, 622, 623; 280/43.17, 43.21; 254/2 R, 6 R, 84, 89 R; 187/231, 244, 270; 180/14.2, 15, 19.2

[56] References Cited

U.S. PATENT DOCUMENTS

| | | | |
|---|---|---|---|
| 3,195,859 | 7/1965 | Jackson et al. | 254/2 R |
| 4,516,901 | 5/1985 | Riedl | 414/458 |
| 4,611,816 | 9/1986 | Traister et al. | 414/458 X |
| 4,712,966 | 12/1987 | Gross | 414/458 |
| 4,913,614 | 4/1990 | O'Rarden | 187/244 X |
| 4,921,264 | 5/1990 | Duffy | 414/458 X |
| 4,934,893 | 6/1990 | Johnson | 414/458 |
| 5,193,828 | 3/1993 | Benvenuti | 280/43.17 X |
| 5,417,539 | 5/1995 | van der Wal | 414/458 |

OTHER PUBLICATIONS

Table Mover, Barber's of Iowa, Inc. dba Barber's Metal Fabricating.

Instruction Sheet for Table Mover, Barber's Metal Fabricating.

The Gondola "Rolling Jack", Roll–it, Quebec.

*Primary Examiner*—James W. Keenan
*Attorney, Agent, or Firm*—Zarley, McKee, Thomte, Voorhees, & Sease

[57] ABSTRACT

A gondola moving system is provided for moving fully loaded gondolas in lateral or longitudinal directions. The gondola mover includes a plurality of lift assemblies, which can be sequentially connected to one another, depending upon the length of the gondola. Each lift assembly includes a lift arm having a first end extending through the gondola posts, and a second end mounted upon a jack assembly. A base bracket extends between the lift arm and the leg of the gondola. Connecting bars extend between adjacent lift arms. The lift assembly components are quickly and easily assembled and installed upon the gondola without the use of tools.

9 Claims, 4 Drawing Sheets

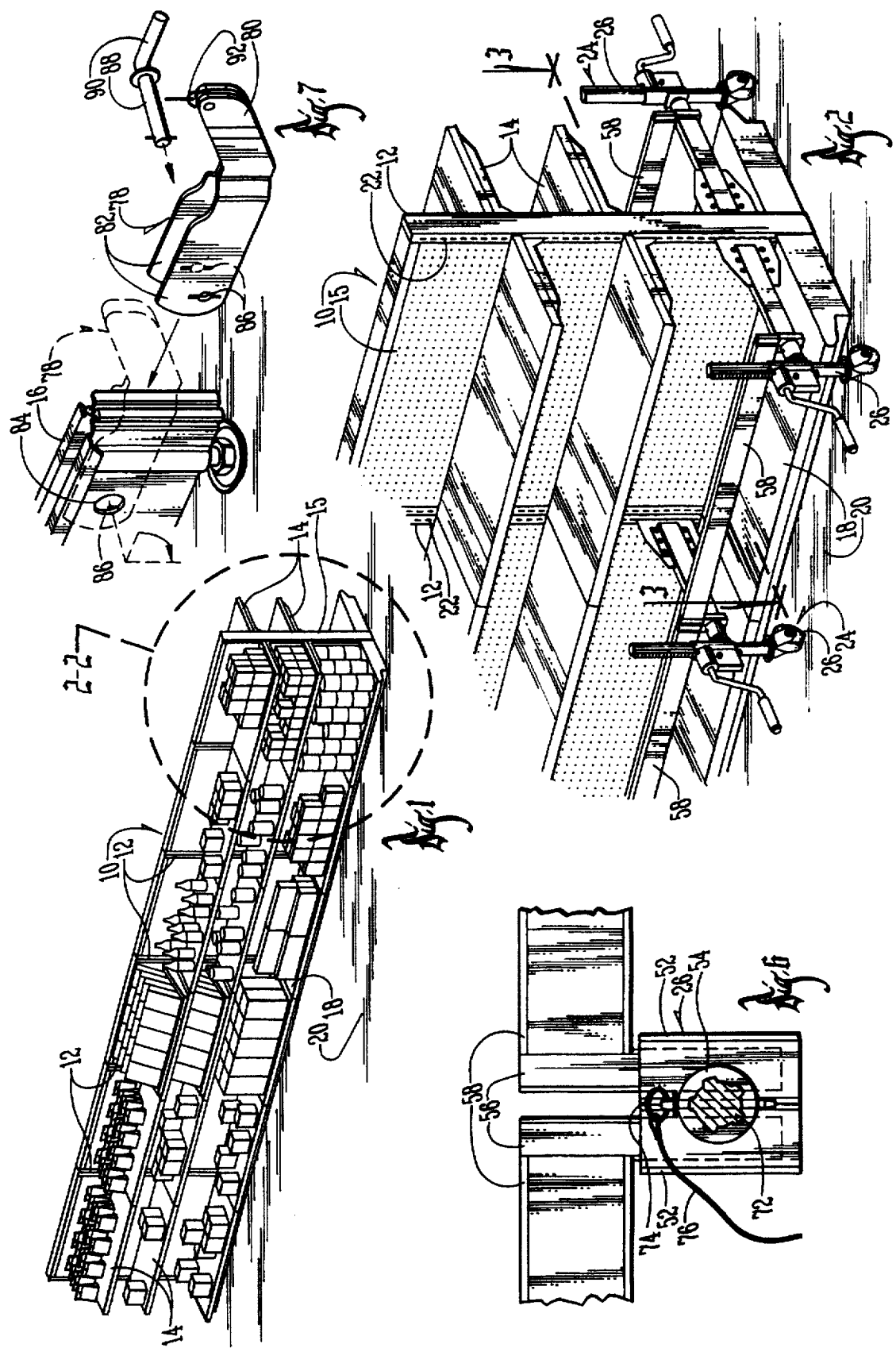

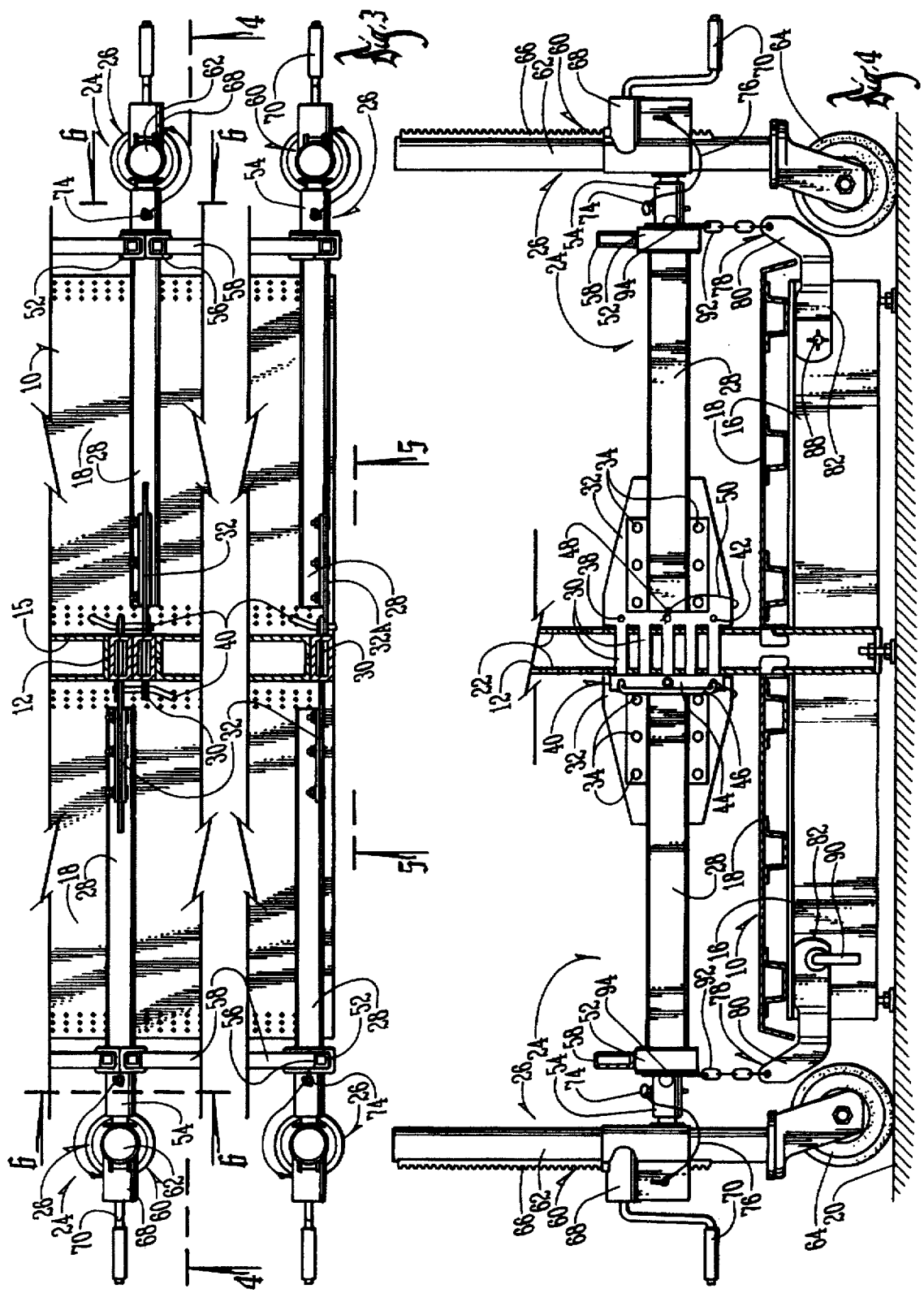

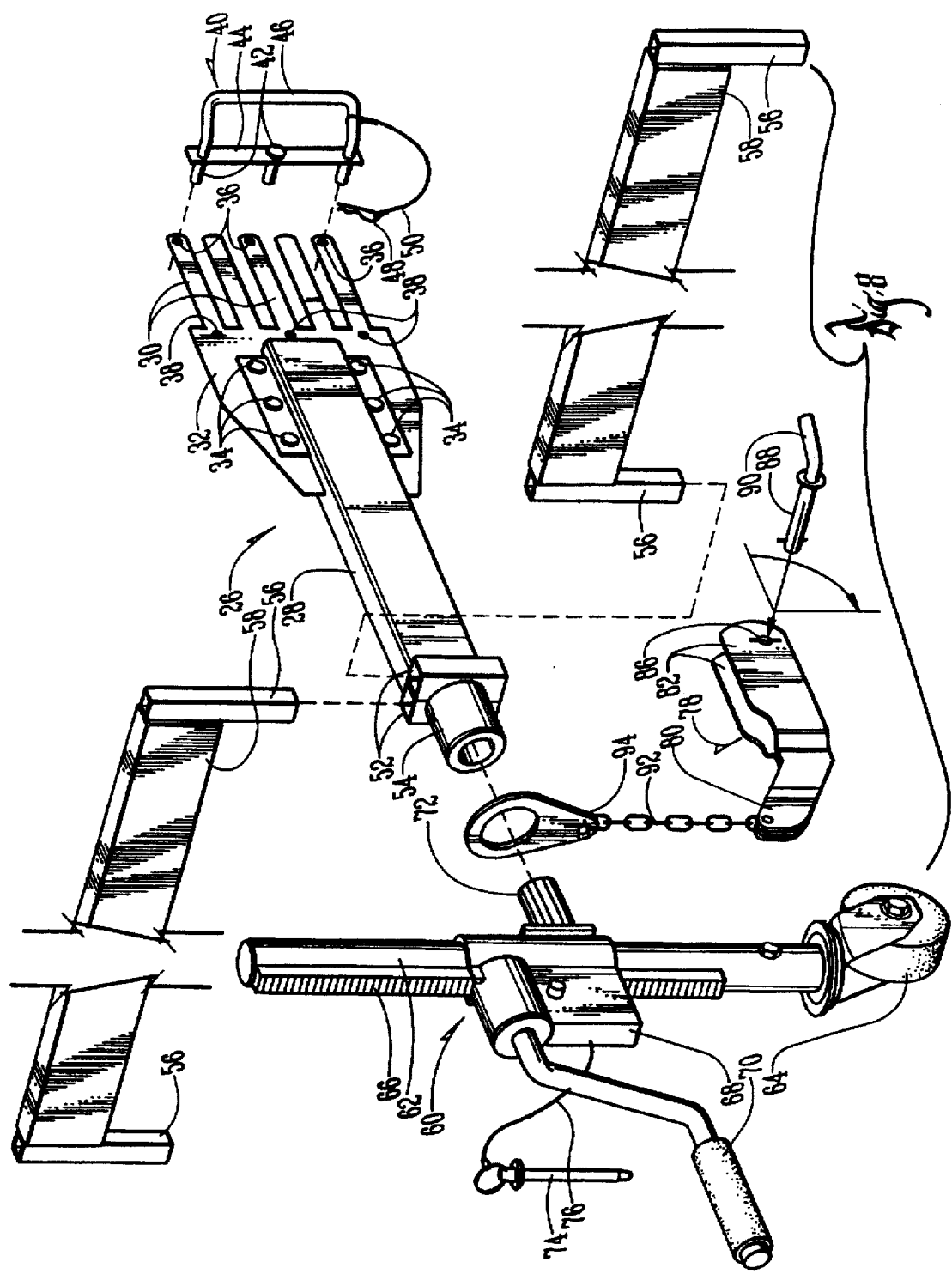

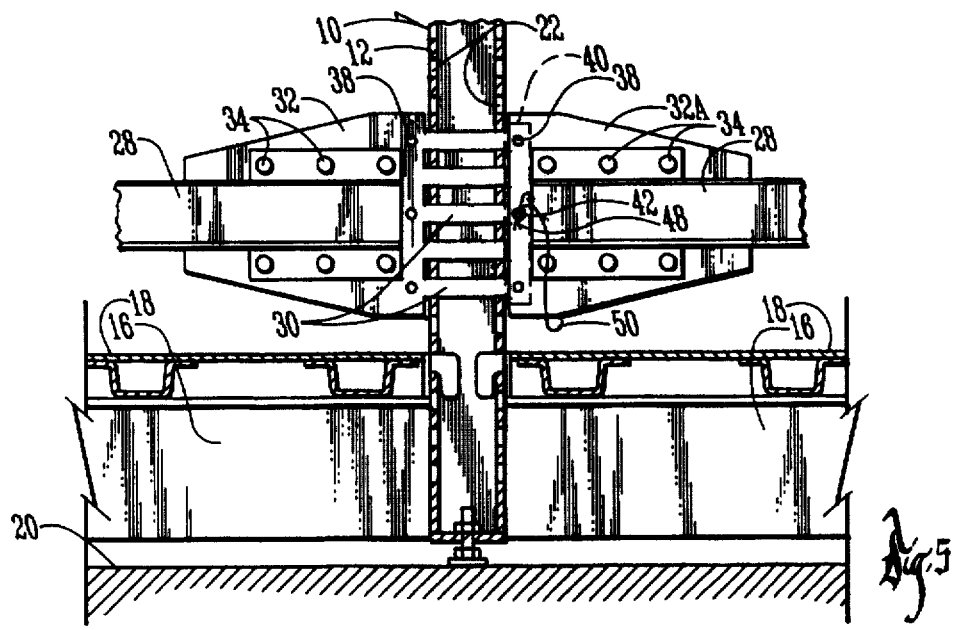
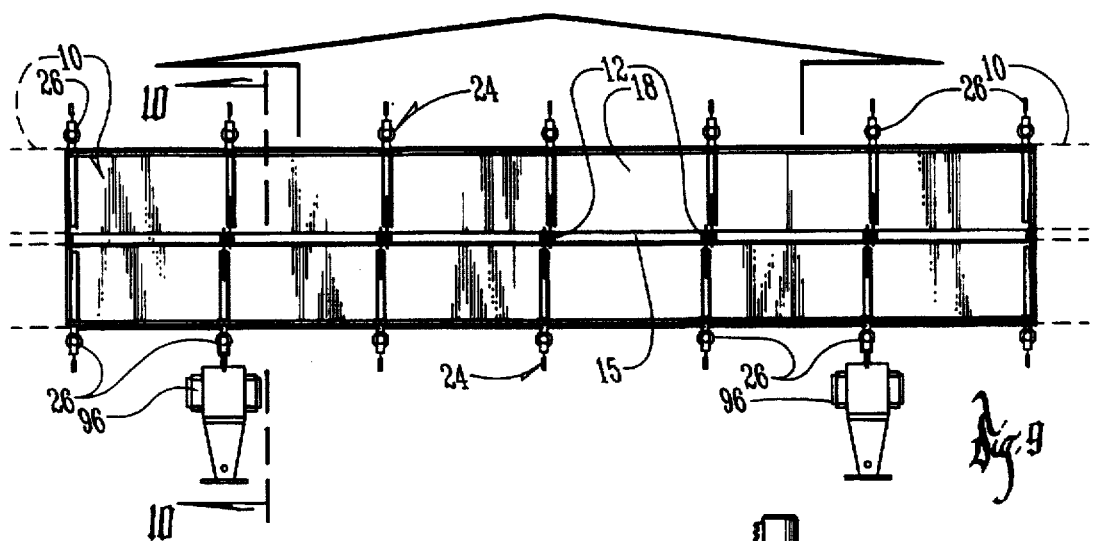
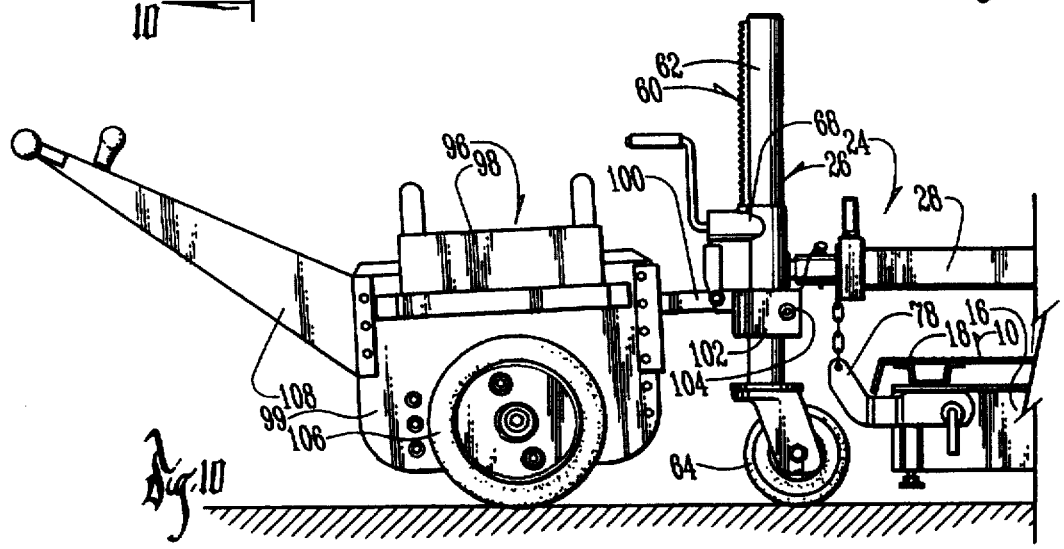

GONDOLA MOVER AND MOVING METHOD

BACKGROUND OF THE INVENTION

Gondola-type shelving is commonly used in many stores to display merchandise. The gondola typically has a plurality of upright posts to which horizontal shelves are attached for displaying merchandise. A leg extends from the base of each upright post to stabilize the post. A bottom or lower shelf is usually placed over the legs for additional display space. Normally, shelves and legs extend on opposite sides of the upright posts, with a wall extending between and connected to the upright posts.

On occasion, it is necessary or desirable for a store to move the gondolas, for example to remodel or rearrange the store. Gondola movers have been known for many years, and normally include arms having fingers which extend through apertures in the upright posts, and a jack assembly for raising the arms and thereby lifting the gondola. Cross braces extend between adjacent lift arms to stabilize the gondola mover. In the past, all products and merchandise had to be removed from the gondola shelves before the gondola could be moved. Such unstocking of the shelves is time consuming, and such time doubles when the shelves are restocked after the gondola has been moved. Also, assembly and installation in prior art gondola movers was time consuming because the components of the mover required many bolts to assemble and to connect the lift arm to the gondola posts. Of course, all of the timely steps required to assemble and install the gondola mover had to be repeated after the gondola was moved and it was desired to disassemble the gondola mover. Some prior art gondola movers, such as the Roll-It manufactured in Quebec, Canada, present safety concerns through the use of an over-center jack assembly which requires a lever arm to pivot the jack assembly into position as the gondola is lifted.

Therefore, a primary objective of the present invention is the provision of an improved gondola mover.

Another objective of the present invention is the provision of a gondola mover which can be quickly and easily assembled and disassembled without the use of tools.

Another objective of the present invention is the provision of a gondola mover having lift assemblies which can be sequentially added to accommodate a gondola of any length.

A further objective of the present invention is the provision of a gondola mover which can move the gondola laterally or longitudinally.

Another objective of the present invention is the provision of a gondola mover which can move a substantially fully stocked gondola.

A further objective of the present invention is the provision of a gondola mover utilizing motorized trucks to facilitate movement of the gondola.

Another objective of the present invention is the provision of a gondola mover wherein the components are pinned together to retentatively and releasably secure the components to one another, without the use of tools.

A further objective of the present invention is the provision of a gondola mover which is connected to the upright posts and the legs of the gondola such that the gondola can be moved while substantially fully stocked.

Still a further objective of the present invention is the provision of a method for moving a gondola which is quick and easy.

Another objective of the present invention is the provision of a method and means for moving a gondola which is economical and safe.

These and other objective will become apparent from the following description of the invention.

SUMMARY OF THE INVENTION

A gondola mover and a method for moving gondolas is provided. The mover includes a plurality of lift arms having first and second ends. The first ends of the lift arms have fingers which extend through apertures in the upright posts of the gondola. The fingers are pinned on the opposite side of the posts to retain the fingers in place. The second ends of the lift arms are pinned to the jack lift of jack assemblies which are mounted on wheels. Base brackets are connected to each of the lift arms and pinned to each of the legs of the gondola. Connecting bars are slip fit into tubes on adjacent lift arms to interconnect the arms. Thus, the entire assembly of the lift assemblies is performed quickly and easily without the use of tools. If the gondola has shelves extending on opposite sides of the upright posts, lift assemblies are placed on each side of the upright posts. It is not necessary to unstock or unload merchandise or products from the gondola shelves.

After the lift assembly components are connected and attached to the gondola, the jack assemblies are actuated to raise the lift arms and thereby lift the gondola off the floor. Motorized trucks are attachable to the jack assemblies to move the gondola laterally or longitudinally.

The gondola mover of the present invention can be used upon gondolas of any length simply by adding additional lift arms, jack assemblies and base brackets at each upright post of the gondola.

BRIEF DESCRIPTION OF THE DRAWING

FIG. 1 is a perspective view of a substantially fully stocked gondola having shelving extending in opposite directions.

FIG. 2 is an enlarged perspective view of an end portion of the gondola, with the gondola mover of the present invention attached to the gondola.

FIG. 3 is a sectional plan view taken along lines 3—3 of FIG. 2.

FIG. 4 is a side sectional view taken along lines 4—4 of FIG. 3.

FIG. 5 is a side sectional view taken along lines 5—5 of FIG. 3.

FIG. 6 is an enlarged elevational view showing the connection of a lift arm to connecting bars and to a jack assembly.

FIG. 7 is an enlarged exploded perspective view showing the base bracket of the gondola mover.

FIG. 8 is an exploded perspective view showing the components of the gondola mover.

FIG. 9 is a plan view of the gondola mover of the present invention.

FIG. 10 is an elevational view taken along lines 10—10 of FIG. 9.

In FIGS. 2–5, 9 and 10, for purposes of clarity, merchandise and products are not shown on the gondola shelves, though it is understood that the gondola mover of the present invention can move the gondola as fully stocked.

DETAILED DESCRIPTION OF THE PREFERRED EMBODIMENT

A conventional gondola is designated in the drawings by the reference numeral 10. The gondola includes a plurality of upright posts 12. As best seen in FIG. 2, a single post is provided on the end of each gondola 10, while dual posts 12 are provided along the length of the gondola 10. Shelves 14 extend from one or both sides of the posts 12. A wall 15 extends between the posts 12 to provide a backstop for each shelf. Legs 16 extend outwardly from the posts 12 to stabilize the posts, and support a bottom shelf 18. The shelves 14 may be stocked with miscellaneous merchandise and products, though the bottom shelf 18 typically holds heavier merchandise, since the bottom shelves are supported by the floor 20 via the legs 16. The posts 12 have a plurality of apertures 22 extending along their height. The gondola 10 may be of any length. The gondola 10 has conventional construction and is not a part of the present invention.

The gondola mover of the present invention is generally designated in the drawings by the reference number 24. The mover 24 includes a plurality of lift assemblies 26, whose components are best shown in FIGS. 2 and 8.

More particularly, each lift assembly 26 includes a lift arm 28 having a first end with a plurality of fingers 30 extending therefrom. Preferably, the fingers 30 are integrally formed with a plate 32 which is connected the second end of the lift arm 28 with bolts 34 or any other convenient means. The number of fingers 30 on the finger plate 32 may vary, depending on the brand of gondola being moved. At least some of the fingers 32 have apertures 36 therein. The plate 32 also has apertures 38 aligning with the apertures 36 of the fingers 30.

The fingers 30 are adapted to extend through the slots 22 in the posts 12. As seen in FIG. 3, the fingers 30 of one lift arm 28 extend through the slots of one of the posts 12, while the fingers of the other lift arm on the opposite side of the wall 15 extend through the slots in the adjacent post. The lift arms 28 are retained in position relative to the posts by a pin member 40, as best seen in FIGS. 3 and 8. The pin member 40 includes a plurality of pins 42 interconnected by a bar 44. A handle 46 on the pin member 40 allows the pins 42 to be quickly and easily installed through the aligned apertures 36 and 38 on the opposing lift arms 28, as best seen in FIG. 3. A spring clip 48 is insertable through a small hole in one of the pins 42 so as to prevent the pin member 40 from accidentally or inadvertently coming out of the apertures 36, 38.

Since there is only a single post 12 on the ends of the gondola 10, a modified plate 32A without fingers is provided on one of the lift arms 28, such that the pin member 40 can extend through apertures 36 in the fingers 30 of one lift arm and the apertures 38 in the modified plate 32A of the opposite lift arm 28, as seen in FIG. 3. As seen in FIG. 8, a wire or strap 50 has opposite ends attached to the handle 46 of the pin member 40 and to the spring clip 48 to prevent the spring clip from being lost.

The second end of each lift arm 28 has a pair of vertically oriented tubes 52 and an axially oriented collar 54. The tubes 52 are shown to be square, but may have other cross-sectional shapes. The tubes 52 are adapted to slidably receive a leg 56 of a connecting bar 58. The leg 56 simply slip fits into the top of the tube 52 such that the bar 58 interconnects adjacent lift arms 28, as best seen in FIGS. 2, 3 and 9.

The collar 54 on the second end of the lift arm 28 slidably mounts the lift arm onto a jack assembly 60. More particularly, the jack assembly 60 includes an upright jack post or leg 62 mounted upon a caster wheel 64. The jack leg 62 includes a plurality of teeth 66 along which a jack lift 68 can be controllably raised and lowered. The jack lift 68 includes a hand crank 70 extending outwardly from the jack leg 62 and a stub shaft 72 extending inwardly from the leg 62. With the exception of the stub shaft 72, the jack assembly 60 is of conventional construction.

The stub shaft 72 of the jack lift 68 is adapted to be received within the collar 54 on the second end of the lift arm 28. Preferably, the collar 54 and the stub shaft 72 are splined or keyed, as best seen in FIG. 6, so as to prevent rotational movement or twisting of the lift arm 28 relative to the jack assembly 60. The collar 54 and the stub shaft 72 include apertures which are aligned when the collar and the stub shaft are matingly engaged, with the apertures being adapted to receive a pin 74, which prevents accidental or inadvertent withdrawal of the stub shaft 72 from the collar 54. A wire or strap 76 extends between the pin 74 and the jack lift 68, to prevent the pin from being lost.

Each lift assembly 26 also includes a base bracket 78. The base bracket 78 includes a yoke 80 having spaced apart legs 82 which are adapted to fit on opposite sides of the leg 16 of the gondola 10. The gondola legs 16 typically have an aperture 84 (FIG. 7) through which electrical wire may be threaded. The legs 82 of the yoke 80 included keyed holes 86 which align with the hole 84 in the gondola leg 16, so as to receive a keyed pin 88. The pin 88 includes an angularly disposed handle 90. When the pin 88 is inserted through the aligned holes 84, 86, the handle is substantially horizontally disposed, as shown in FIG. 7. Upon release of the handle, the weight of the handle causes the pin 88 to automatically rotate so as to lock the pin in place. If there is sufficient friction between the pin 88 and the holes 86, the handle 90 of the pin 88 can be easily turned so as to lock the pin in place.

The opposite end of the yoke 80 is connected to a chain 92 extending from a ring 94. The ring 94 is adapted to fit over the collar 54 of the lift arm 28, before the lift arm is mounted upon the stub shaft 72 of the jack assembly 60. Thus, as more fully described below, when the lift arm 28 is raised by the jack lift 68, the base bracket 78 raises the gondola leg 16, which normally supports substantial merchandise weight.

The plates 32, 32A are bolted to the lift arms 28 at the factory. The lift assembly components may be compactly stored in a cart for shipping and storage. At the work site, the lift assembly components can be quickly and easily assembled and installed upon the gondola 10 without the use of tools.

More particularly, to install each lift assembly to one of the posts 12 of the gondola 10, the fingers 30 of the lift arm 28 are inserted through the slots 22 in the posts 12 as close to the bottom shelf 18 as possible. Merchandise may need to be moved slightly to provide clearance for the lift arm. After the lift arms are positioned on opposite sides of the posts, the pin member 40 may be quickly and easily inserted through the aligned apertures 36, 38, and retained by the spring clip 48.

The ring 94 of the base bracket 78 is slipped over the collar 54, which can then quickly and easily receive the stub shaft 72 of the jack assembly 60. The pin 74 is inserted through the aligned holes in the collar 54 and stub shaft 72 so as to lock the jack assembly 60 to the lift arm 28. The yoke 80 of the base bracket 78 is mounted on the leg 16 of the gondola 10, and secured thereto by the pin 88. The connecting bars 58 are mounted on adjacent lift arms 28 through the slip fit of the bar leg 56 into the lift arm tube 52. Thus, the complete assembly of the lift assembly 26 is quickly and easily accomplished without the use of tools. The lift assembly can be similarly disassembled without the use of tools.

After the lift assembly components are assembled and installed on the gondola 10, the hand cranks 70 of the jack assemblies 60 can be turned to raise the lift arms 28, and thereby lift the gondola 10 off the floor 20. The base bracket 78 provides a lifting force to the leg 16 of the gondola 10 and also stabilizes the posts 12. Without the base bracket, the bottom shelf 18 would have to be unloaded and cleared of merchandise before the gondola can be lifted, so as to avoid undesirable torque.

Before or after the gondola is lifted, a plurality of motorized trucks 96 are attached to at least two of the lift assemblies, as shown in FIGS. 9 and 10. The trucks are commercially available, but have been slightly modified by adding weighted saddle bags 98 to the truck body 99 and a front hitch 100. The hitch 100 includes a yoke 102 which extends around the jack leg 62, and is held in place by a pin 104 extending through both legs of the yoke 102, as best seen in FIG. 10. The trucks 96 include soft rubber wheels 106 to provide increased friction between the wheels and the floor 20. A handle 108 extends rearwardly from the truck body 99.

After the gondola 10 is raised off of the floor 20 by the lift assemblies 26, operators can actuate the motorized trucks 96 to roll the gondola 10 upon the caster wheels 64 to a desired location. As seen in FIG. 9, the trucks 96 are connected to lift assemblies on one side of the gondola, such that the gondola is moved laterally. Alternatively, the trucks 96 may be attached to a pair of lift assemblies on the end of the gondola, such that the gondola can be moved longitudinally. While FIG. 9 shows two trucks 96 being used, it is understood that additional trucks may be required depending upon the loaded weight and length of the gondola. Also, if the gondola is not stocked or the merchandise is light weight, it may be possible for operators to manually move the gondola without the use of the trucks 96.

Whereas the invention has been shown and described in connection with the preferred embodiment thereof, it will be understood that many modifications, substitutions, and additions may be made which are within the intended broad scope of the following claims. From the foregoing, it can be seen that the present invention accomplishes at least all of the stated objectives.

What is claimed is:

1. A gondola moving system for moving a gondola having a plurality of spaced apart upright posts with apertures extending through each post, a plurality of shelves extending from the posts, and a plurality of legs extending from the posts for engagement with a floor, the system comprising:

a plurality of lift arms having opposite first and second ends, the first end of each lift arm having fingers extending therefrom, the fingers being adapted to extend through the apertures in one of the upright posts;

a plurality of jack assemblies, each having a jack post mounted upon a wheel, a crank movable along the jack post, and a shaft extending substantially horizontally from the crank, the shaft being adapted to couple with the second end of one of the lift arms;

a plurality of elongated connecting bars, each bar extending between adjacent lift arms adjacent the second end thereof, the connecting bar having a length substantially equivalent to the spacing between the upright posts of the gondola;

a plurality of base brackets, each having one end attachable to one of the legs of the gondola and an opposite end operatively supported from one of the lift arms; and the cranks being operative to move along the jack posts thereby raising the lift arms and base brackets, and thereby adapted to lift the upright posts, shelves and legs of the gondola off the floor.

2. The gondola moving system of claim 1 wherein the lift arms are adapted to be pinned to the upright posts of the gondola and to the jack assemblies, the base brackets are adapted to be pinned to the gondola legs, and the connecting bars being slip fit onto the lift arms such that the gondola moving system is assembled and disassembled without the use of tools.

3. The gondola moving system of claim 1 further comprising a plurality of pin members each being extendible through at least one finger of one of the lift arms to retain the lift arm to the gondola upright post.

4. The gondola moving system of claim 1 further comprising a plurality of base pins, each being extendible through one of the base brackets and one of the legs of the gondola to secure the base bracket to the leg.

5. The gondola moving system of claim 4 wherein each base pin is keyed, and each base bracket has a keyed slot for receiving the keyed pin, whereby rotation of the pin prevents removal of the pin from the base bracket.

6. The gondola moving system of claim 1 wherein each base bracket includes a yoke extendible on opposite sides of the gondola leg.

7. The gondola moving system of claim 1 wherein a flexible member extends between each lift arm and base bracket.

8. The gondola moving system of claim 1 wherein the second end of each lift arm has a splined collar and the shaft of each jack assembly is splined such that mating engagement of the shaft and the collar prevents twisting of the lift arm.

9. The gondola moving system of claim 1 further comprising a motorized truck attached to one of the jack assemblies for facilitating movement of the gondola.

* * * * *